United States Patent Office 3,416,755
Patented Dec. 17, 1968

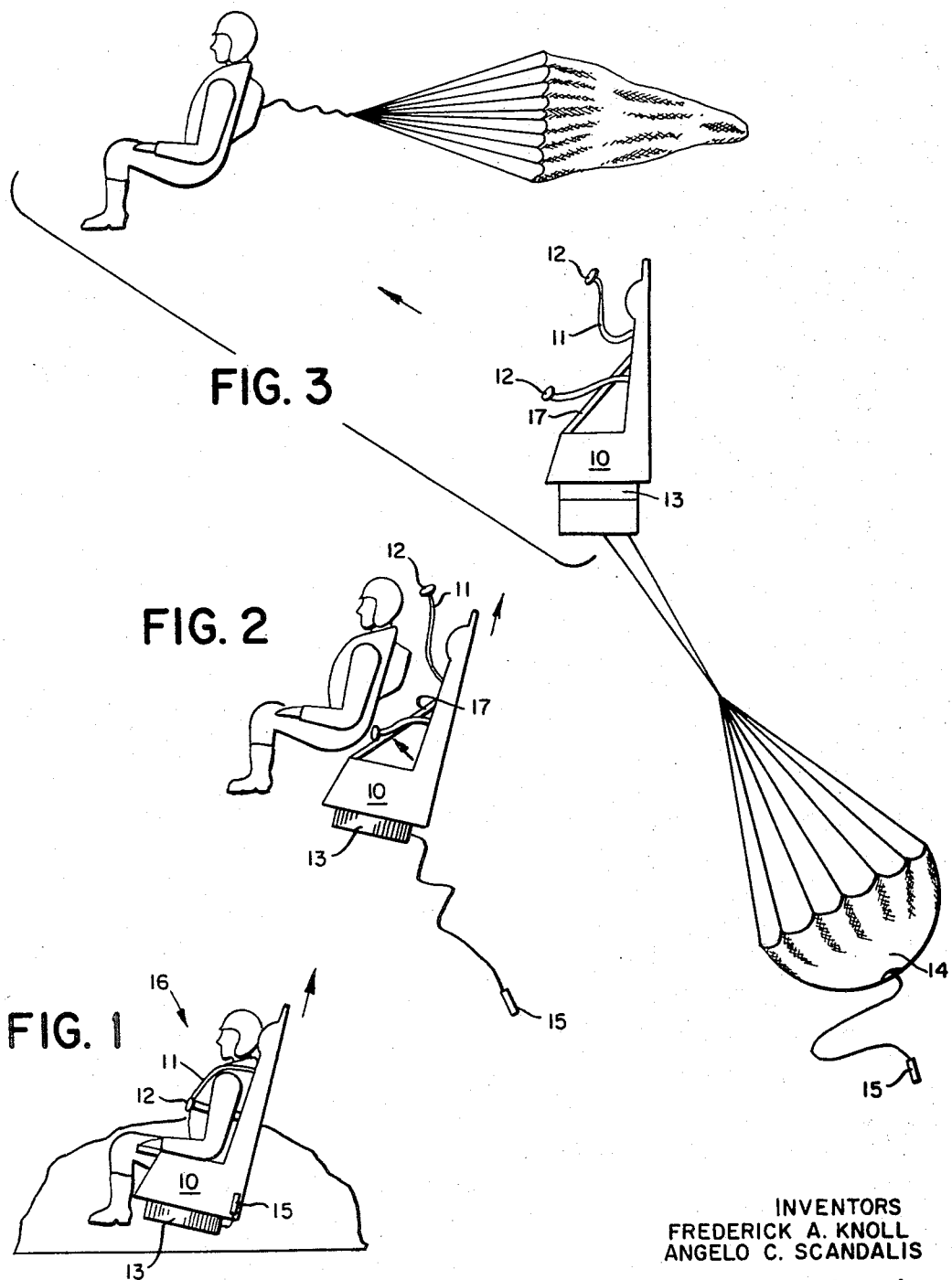

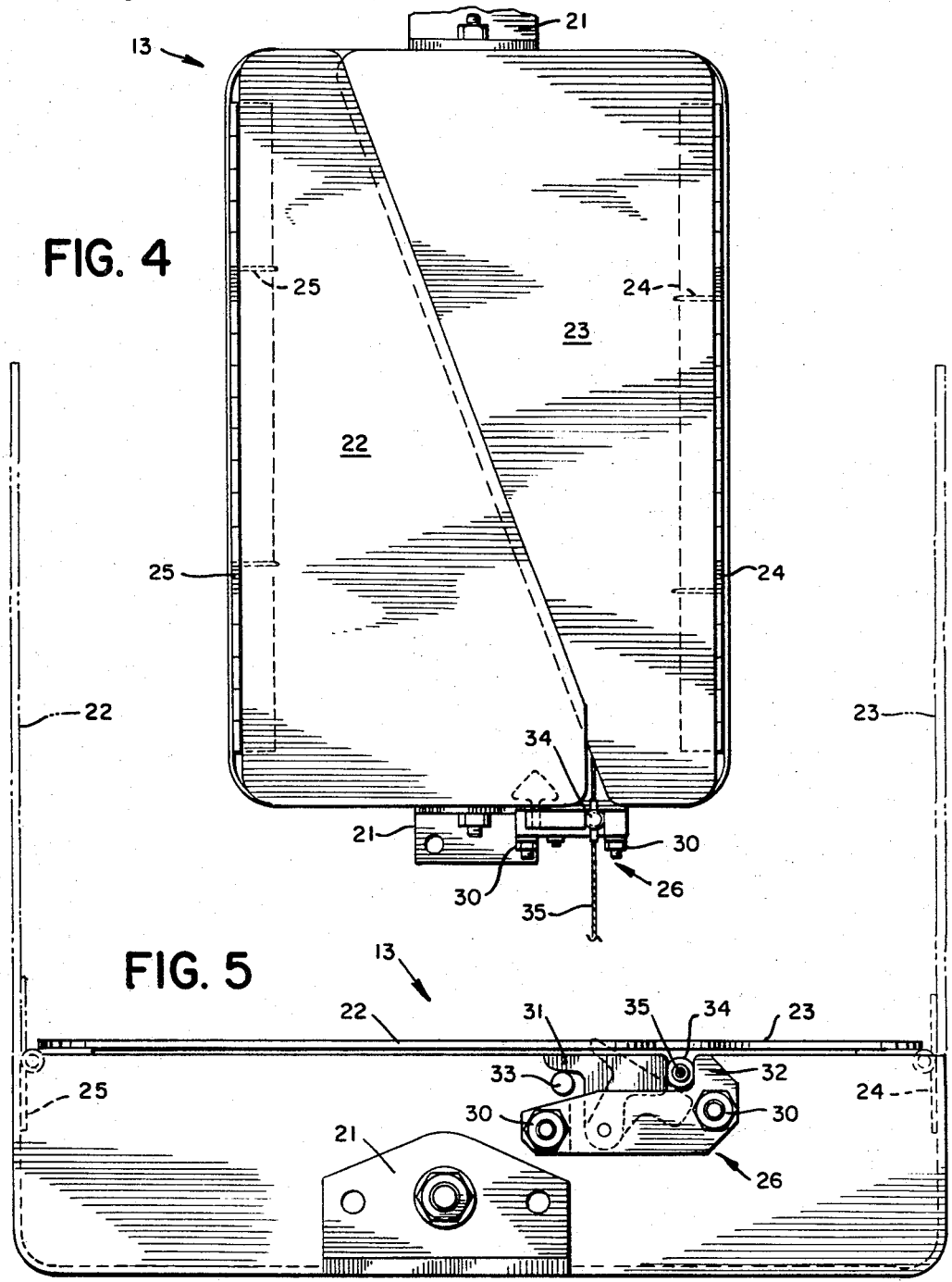

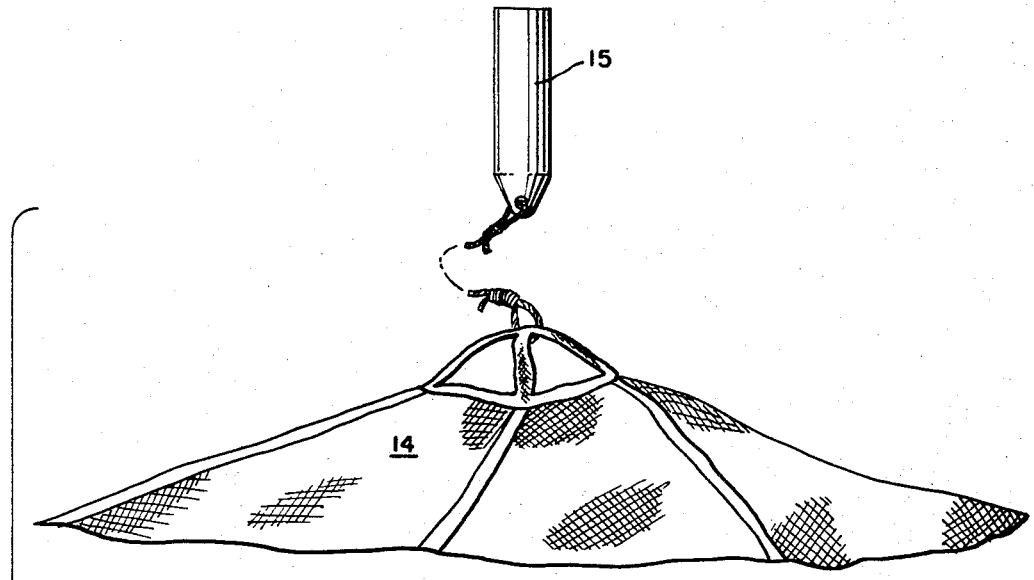
FIG. 6
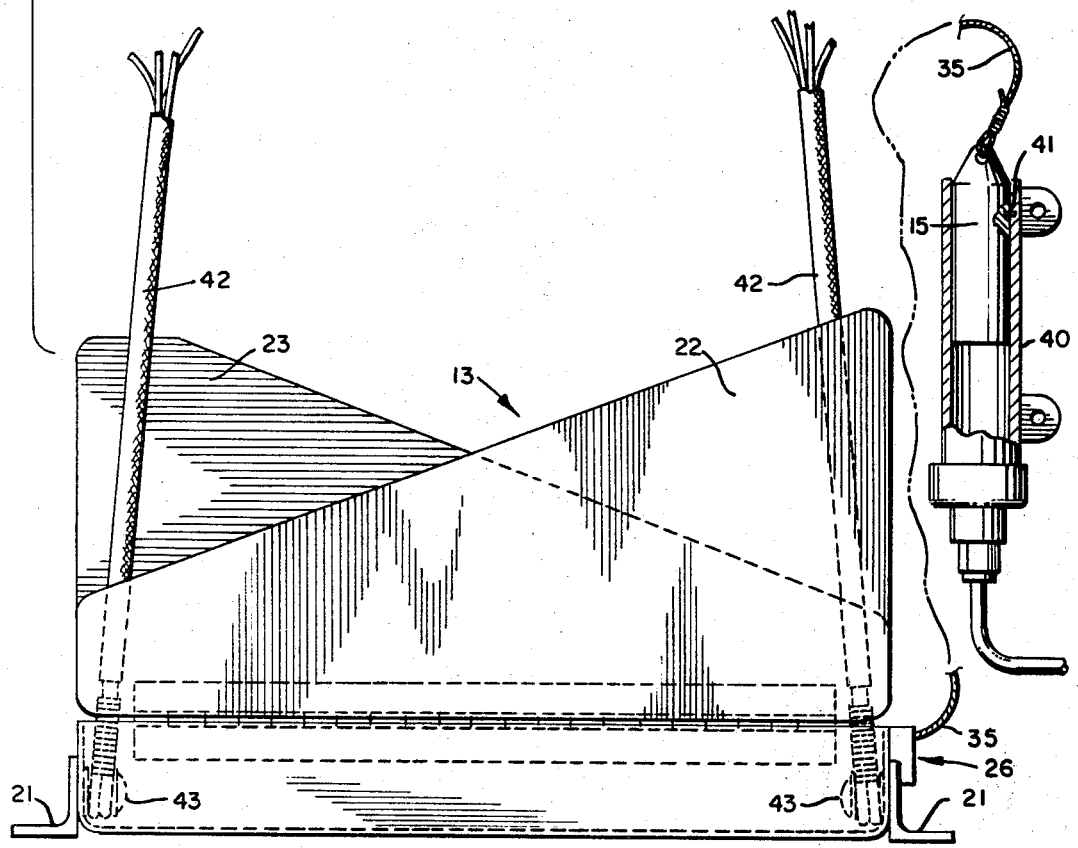

3,416,755
AIRCARFT EJECTION SEAT SEPARATION AND RETARDATION SYSTEM
Frederick A. Knoll, Woodmere, and Angelo C. Scandalis, Northport, N.Y., asignors to Fairchild Hiller Corporation, a corporation of Maryland
Filed Aug. 29, 1966, Ser. No. 575,785
8 Claims. (Cl. 244—122)

ABSTRACT OF THE DISCLOSURE

An aircraft emergency ejection system employing a forcibly deployed drogue chute attached to the ejection seat for separating the seat from the pilot after ejection and after separation of the pilot from the seat.

---

This invention relates to aircraft emergency ejection systems and more particularly to a system for automatically separating the pilot from his ejection seat and retarding the separated seat from the pilot after the pilot/seat combination is ejected from the aircraft.

It has long been known that high speed aircraft require a system for ejecting a pilot clear of the aircraft if an in-fight emergency should arise. One of the major problems encountered in such ejection systems is the risk of collision between the pilot and the ejection seat during the pilot's parachute descent. These collisions cause serious injuries to pilots, all too frequently resulting in death.

Several systems have been devised to protect against collisions. In the simplest arrangement, the pilot remains in his ejection seat during his parachute descent all the way to ground level, or just above ground level where he separates from the seat. This arrangement is disadvantageous since it impedes the pilot's maneuverability during his descent and encumbers his movements just prior to landing, which is a most critical phase of the parachute descent.

Another method employed to minimize collision risks between the pilot and his ejection seat is that wherein separate parachutes are provided for the pilot and the seat. The seat parachute deploys first and stabilizes the pilot/seat combination. After the combination is stabilized, the pilot then separates from the seat and deploys his own parachute. There still exists the risk of collision in this system, since the pilot and seat descend to the earth in the near vicinity of each other and with the seat descending from a position above the pilot.

Still another arrangement for lessening the risk of collision is one where the seat stabilizing chute first stabilizes the pilot/seat combination, and after the pilot separates from the stabilized seat, then automatically deploys the pilot's main chute. The risk of collision in this arrangement is essentially the same as that of the system discussed in the immediately preceding paragraph.

We have discovered a system whereby this risk of collision can be reduced substantially from the level encountered in the above described arrangements. In this system we employ a positive pilot/seat separator in combination with a seat retardation apparatus which is actuated instantly after the pilot/seat separator operates. This seat retardation apparatus includes a forcibly deployed drogue chute for slowing and thereby separating the empty ejection seat from the pilot instantly after separation of the pilot from the seat. The pilot's main chute is deployed only after the empty ejection seat has been separated a safe distance from the pilot. Because of the small size of the seat drogue chute, the seat descends to the earth very rapidly free and clear of the pilot.

Another important part of our invention is the novel drogue shute storage container which we provide. This container is a quick-opening latch closed container mounted preferably directly beneath and onto the pilot's ejection seat. In a preferred embodiment the latch of this container is opened by a ballistic slug which also serves to forcibly deploy the drogue chute in the manner described below. Major advantages of this chute container and deployment apparatus are that it requires minimal ballistic energy for releasing and deploying the chute, thus permitting the use of less ballistic energy while still providing unusually fast and effective deployment of the drogue chute.

It is therefore a principal object of our invention to provide a pilot/seat ejection system for separating and retarding the empty ejection seat from the pilot to reduce the risk of collosion between the empty seat and the pilot.

It is another object of our invention to provide means for storing, releasing and deploying a drogue chute attached to the ejection seat in a manner permitting fast and effective deployment of that drogue chute.

It is a still further object of this invention to provide a means for releasing and deploying a drogue chute attached to the ejection seat which requires minimal power for forcibly unfurling the drogue chute.

These and other objects of our invention will become apparent from consideration of the following detailed description and drawings wherein:

FIGURES 1 through 3 sequentially illustrate the operation of a system made in accordance with our invention;

FIGURE 4 is a plan view of a drogue chute container constructed in accordance with our invention;

FIGURE 5 is a side view of the chute container illustrated in FIGURE 4, and

FIGURE 6 is a front view of the chute container illustrated in FIGURE 4, including illustration of the drogue chute connection to the container.

Referring to FIGURES 1 through 3 which illustrate the sequence of operation and the over-all system, during the initial phase of the ejection of the pilot/seat combination the pilot is restrained to the seat 10 by restraining means such as a lap belt or safety harness 11. Safety harness 11 has a quick release mechanism 12 which when tripped frees the pilot from the seat 10. Connected to the underside of seat 10 is the drogue chute container 13 which holds drogue chute 14 in its furled condition until released by slug 15 in the manner described below.

Ejection may be initiated by any of a number of conventional methods such as by actuation of a handle, lever or the squeezing of a trigger. This begins the ejection sequence, which first rockets the pilot/seat combination out of the aircraft, generally indicated by reference numeral 16. As the pilot/seat combination accelerates out of the aircraft 16, an arming trigger (not shown) is tripped in the process of leaving the aircraft 16. This arming trigger initiates a power input, for example a gas pressure charge, for the purpose of actuating the harness release 12. Actuation of release 12 frees the pilot from seat 10. This same power input actuates the pilot/seat separator 17, which in the embodiment illustrated in FIG. 2 is a strap spanning the seat and back portions of seat 10, which when actuated snaps taut to kick the pilot and seat 10 apart.

After the pilot and seat 10 have been separated in this manner, drogue chute 14 is deployed to retard seat 10 and thereby further separate seat 10 from the pilot. Before describing in detail the manner by which drogue chute 14 is deployed, it would be helpful to discuss the time lapses between each of the above described steps of the ejection operation. In one suitable embodiment of this invention the power furnished to actuate harness release 12 and separator 17 is furnished by the firing of a gas generator one second after the tripping action caused by the passage of seat 10 out of the aircraft 16. This same gas generator pressure then fires slug 15 within 20 milliseconds (.020 sec.) after the actuation of harness release 12 and pilot seat separator 17. The referenced time delay sequence can be accomplished by any of a variety of conventional time delay mechanisms. For example, a suitable one is a mechanism bearing the military designation M–32 Delay Initiator. This mechanism consists of a constant volume chamber with a single orifice, a mechanically operated firing mechanism, and a length of hose connecting the orifice to the device being actuated. In the system described herein, the delay initiator is activated by the tripping action caused by the passage of seat 10 out of the aircraft 16. The initiator then fires one second after being activated by the tripping action and generates the pressure which fires slug 15 within the above-referenced 20 milliseconds after the actuation of harness release 12 and pilot seat separator 17. It should therefore be appreciated that the time interval between "seat-clear-of-cockpit" to "full parachute deployment" of the pilot's parachute can be reduced to an absolute minimum by this apparatus. Thus, the deployment of drogue chute 14 practically instantly after the separation of the pilot from seat 10 provides the necessary decelerative action to the vacated seat 10 to prevent it from continuing on a collision course that would intersect with the pilot or with the pilot's parachute.

It should also be recognized that drogue chute 14 is a relatively small chute and not intended to stabilize seat 10, but rather only to decelerate seat 10 and thereby separate it from the pilot. We have found that a drogue chute 14 having a diameter of 8 feet is quite satisfactory for this purpose.

Referring to FIGURES 4 through 6, the drogue chute 14 is packed in a small container 13 which is held by bolted brackets 21 to the underside of seat 10. Since the time required to release and deploy drogue chute 14 is so critical to the successful operation of this system, the design and operation of chute container 13 are also important features of this invention.

Referring to the embodiment illustrated in FIGURES 4–6, parachute container 13 may be a rectangularly shaped box having a quick opening top consisting of two mating flaps 22 and 23. These flaps are spring biased by torsion springs 24 and 25 respectively to spring open and thereby release chute 14, unless restrained from doing so by latch mechanism 26. Latch mechanism 26, which as can be seen is off center to container 13, holds down flap 22 when latch mechanism 26 is in the closed position. Restraining of flap 22 in its closed position holds down flap 23 because of the overlapping edge of flap 22.

Latch mechanism 26 is connected to one side of container 13, by bolts 30. Movable catch 31 is pivoted to the stationary detent 32 which is held in place by bolts 30. In the closed position catch 31 keys in between lug 33 and flap 22 to which lug 33 is connected. Catch 31 is retained in this closed locked position by swaged ball 34 which is releasably held between detent 32 and catch 31. When swaged ball 34 is withdrawn from between detent 32 and catch 31 by force exerted on lanyard 35, this permits torsion spring 24 to pivot flap 22 upwardly thus releasing flap 23 and swinging catch 31 to its disengaged (dashed line) position.

The relationship between the release of latch mechanism 26 to the overall ejection operation will now be described. As noted above, when the pilot ejects, seat 10 and the pilot are rocketed out of the aircraft 16. Passage of seat 10 past aircraft 16 trips a trigger (not shown) which in the embodiment illustrated herein initiates the firing of a gas generator (not shown) one second after the tripping action. Gas pressure from this gas generator actuates harness release 12 and seat separator 17 to push the pilot and seat 10 apart. Gas pressure tapped off of the actuating hook-up for harness release 12 is used to fire drogue chute gun 40 (FIG. 6). This fires slug 15 out of the muzzle of drogue chute gun 40, breaking shear pin 41 in its passage outwardly through the muzzle. Slug 15 is connected to lanyard 35 and thereby disengages swaged ball 34 from latch mechanism 26 thus opening parachute container 13. Slug 15 continues to travel outwardly pulling lanyard 35 with it. Lanyard 35 is connected to drogue chute 14 to snatch it out of container 13 and forcibly deploy it. Chute 14 is connected through shrouds 42 to lugs 43 which are centered on chute container bolting brackets 21.

Thus chute 14 is deployed by the firing of drogue chute gun 40 which requires a minimum of gas pressure due to the small amount of mass required for slug 15 to open latch mechanism 26 and thereafter deploy chute 14. This results in a very fast deployment of chute 14 with a minimum requirement of work input to the chute release and deployment system. Another advantage of the type of container 13 and latch mechanism 26 disclosed herein is that it requires no adjustment, is virtually maintenance free and permits easy visual inspection of the packed chute 14. Furthermore, this chute releases and deployment system serves as an instant "back-up" pilot/seat separation system in the event separator 17 fails to operate properly.

There are of course variations and modifications which will be obvious to those skilled in the art which are applicable to the apparatus disclosed herein, but which do not depart from the inventive idea disclosed. For example any of a variety of ejection seats, triggering devices and power sources for actuating the harness release 12, pilot separator 17 and drogue gun 40 can be used with this invention.

What is claimed is:

1. In an aircraft pilot ejection system, seat/man separation apparatus comprising in combination:
   (a) an ejection seat,
   (b) a relatively small drogue chute attached to said seat adapted to retard the forward motion of said seat after separation of the pilot from the seat and permit rapid descent of said seat after such separation,
   (c) a closed quick-opening container for packing the furled drogue chute to said seat,
   (d) chute deploying means for rapidly opening said container and unfurling said chute, and,
   (e) means for actuating said chute deploying means immediately after the ejection of the seat and pilot from the aircraft and immediately after the release of the pilot from the seat, whereby said drogue chute retards the movement and permits rapid descent of said seat and thereby separates the seat from the pilot.

2. Apparatus as claimed in claim 1 further comprising:
   (a) pilot restraining means for holding a pilot in the seat during ejection of the pilot/seat combination from the aircraft,
   (b) pilot release means for releasing said restraining means immediately after said pilot/seat combination is ejected clear of the aircraft, and
   (c) said actuating means being adapted to cause said chute deploying means to open said container and unfurl said chute immediately after the release of said pilot restraining means.

3. Apparatus as claimed in claim 2 further comprising pilot/seat disengaging means associated with said seat for pushing the pilot and seat apart simultaneously with release of said pilot restraining means.

4. Apparatus as claimed in claim 2 wherein said drogue chute deploying means comprises ballistic mass and lanyard means, latch means operatively connected to said ballistic means for releasably closing said container, means for propelling said ballistic means to a displaced position, said ballistic means actuating said latch means to open said container and snatch said chute therefrom to an unfurled deployed condition when said ballistic means is displaced by said propelling means.

5. In an aircraft pilot ejection system, seat/man separation apparatus comprising:
   (a) an ejection seat,
   (b) pilot restraining means for releasably holding the pilot in said seat during the initial phase of ejection of the pilot/seat combination from the aircraft,
   (c) pilot release means for disengaging said restraining means and releasing the pilot from said seat immediately after the pilot/seat combination is ejected clear of the aircraft,
   (d) a relatively small seat retardation drogue chute attached to said seat for retarding the forward motion of said seat after seat/man disengagement and permitting rapid descent of said seat free and clear of the pilot after such disengagement,
   (e) a releasably closed container for compactly storing said drogue chute, said container being mounted on said seat and including a low energy quick opening latch means for opening said container and releasing said chute,
   (f) ballistic means operatively connected to said latch means and said chute, said ballistic means being adapted to simultaneously open said container and forcibly deploy said chute when said mass is propelled to a displaced position, and
   (g) actuating means for propelling said ballistic mass to open said container and forcibly deploy said chute immediately after said pilot release means has disengaged said pilot restraining means.

6. Ejection seat apparatus as claimed in claim 5 wherein said latch means includes a lanyard openable unlatching mechanism and wherein said ballistic means comprises a slug and lanyard connecting the slug to said latch mechanism and said drogue chute, whereby the propulsion of said slug pulls the lanyard thus releasing the latch mechanism and forcibly deploying the chute.

7. In an aircraft pilot ejection system the method of separating the vacated ejection seat from the ejected pilot comprising in combination the steps of:
   (a) ejecting the pilot and seat as a unit from the aircraft,
   (b) releasing the pilot from the seat after such ejection,
   (c) instantly thereafter deploying a drogue chute connected to the seat to retard the speed of the seat, and
   (d) thereafter deploying the pilot's chute after the seat has been retarded a safe distance behind the pilot.

8. The method as claimed in claim 7 wherein the drogue chute deploying step is initiated by the projecting of a ballistic mass operatively connected to the seat and drogue chute to release the chute from its seat pack and forcibly deploy the chute after its release.

References Cited

UNITED STATES PATENTS

| 1,386,971 | 8/1921  | Summers           | 244—148 |
| 2,527,020 | 10/1950 | Martin            | 244—122 |
| 2,892,602 | 6/1959  | Servanty          | 244—141 |
| 3,027,126 | 3/1962  | Wallace           | 244—141 |
| 3,083,938 | 4/1963  | Brinkworth et al. | 244—122 |

FOREIGN PATENTS

| 1,216,206 | 11/1959 | France. |
| 543,587   | 7/1957  | Canada. |

MILTON BUCHLER, *Primary Examiner.*

FERGUS S. MIDDLETON, *Assistant Examiner.*

U.S. Cl. X.R.

244—147